United States Patent [19]

Ooi et al.

[11] Patent Number: 5,283,675
[45] Date of Patent: Feb. 1, 1994

[54] LIQUID CRYSTAL DISPLAY ELEMENT WITH ELECTRODE HAVING CONCAVE-CONVEX SURFACE AT LIQUID CRYSTAL SIDE

[75] Inventors: Yoshiharu Ooi; Yoshinori Hirai; Satoshi Niiyama; Tsuneo Wakabayashi, all of Yokohama, Japan

[73] Assignee: AG.Technology Co., Ltd., Yokohama, Japan

[21] Appl. No.: 936,633

[22] Filed: Aug. 28, 1992

[30] Foreign Application Priority Data

Aug. 30, 1991 [JP] Japan ................... 3-245136

[51] Int. Cl.⁵ .................. G02F 1/13; G02F 1/1343
[52] U.S. Cl. ........................... 359/51; 359/87
[58] Field of Search ............... 359/40, 41, 51, 87

[56] References Cited

U.S. PATENT DOCUMENTS

| | | | |
|---|---|---|---|
| 4,688,900 | 8/1987 | Doane et al. | 359/52 |
| 4,693,559 | 9/1987 | Baeger | 359/82 |
| 4,726,662 | 2/1988 | Cromack | 359/40 |
| 4,732,456 | 3/1988 | Fergason et al. | 359/40 |
| 5,076,668 | 12/1991 | Dalisa et al. | 359/51 |

FOREIGN PATENT DOCUMENTS

| | | | |
|---|---|---|---|
| 61-067021 | 4/1986 | Japan | 359/87 |
| 1-094316 | 4/1989 | Japan | 359/87 |

*Primary Examiner*—William L. Sikes
*Assistant Examiner*—Anita Pellman Gross
*Attorney, Agent, or Firm*—Oblon, Spivak, McClelland, Maier & Neustadt

[57] ABSTRACT

A liquid crystal display element comprises a liquid crystal and solidified matrix composite, in which liquid crystal is dispersed and held in a solidified matrix, which is interposed between a pair of substrates with electrodes at least one of which is transparent, wherein at least one of the substrates with electrodes has a fine concave-convex electrode surface at the side for the liquid crystal and solidified matrix composite.

32 Claims, 1 Drawing Sheet

LIQUID CRYSTAL DISPLAY ELEMENT WITH ELECTRODE HAVING CONCAVE-CONVEX SURFACE AT LIQUID CRYSTAL SIDE

The present invention relates to a liquid crystal display element including liquid crystal dispersed and held in a solidified matrix and a liquid crystal display apparatus using such display element.

In recent years, liquid crystal displays have been widely used for personal word processors, hand-held computers, portable TV sets and so on, taking the advantages of low power consumption, low driving voltage and so on. Of the liquid crystal displays, liquid crystal display elements having an active element for each picture element electrode have particularly been noted and developed.

As such liquid crystal display elements, there is a proposal on liquid crystal display elements in which a dynamic scattering mode (DSM) liquid crystal is used. However, the liquid crystal display element of this type has a disadvantage of large current consumption because a high value of electric current passed in the DSM liquid crystal. Now, liquid crystal display elements in which a twist nematic (TN) type liquid crystal is used have been widely used. For instance, portable TVs have been widely commercialized. Since the TN type liquid crystal display element has a very small leak current and a small power consumption, it is suitable for using a battery as a power source.

In the TN mode liquid crystal display element, however, there a problem that the transmittance of light is small because two polarization plates are required. In particular, when a color filter is used for obtaining a colored display, only several percents of incident light can be utilized. It is, therefore, necessary to use a strong light source, a result of which is increased power consumption.

In order to solve the problems in the TN mode liquid crystal display element, there is proposed such mode that a liquid crystal and solidified matrix composite in which a nematic liquid crystal is dispersed and held in a solidified matrix such as a polymer matrix is used, and a low voltage such as 10 V or lower is sufficient to drive it by utilizing the transparent-scattering characteristics. Since use of the liquid crystal and solidified matrix composite does not require the polarization plates, a bright display is expected.

However, in the conventional liquid crystal and solidified matrix composite, there is hysteresis in the applied voltage-transmittance characteristics, that is, there is a problem that the transmittance at a voltage level during the increase of applied voltage is different from the transmittance at the same voltage level during the decrease of applied voltage. Accordingly, there is a problem of a phenomenon of image-sticking wherein a picture image which had appeared in the display just before the changing of picture remained in the present display, or reduction of picture quality such as reduction of a gray scale characteristic resulted from since the transmittance does not depend solely on an applied voltage.

The applied voltage-transmittance characteristic of the liquid crystal and solidified matrix composite generally shows a strong non-linearity in comparison with that of a conventional TN mode liquid crystal element, and accordingly, when a gray scale display is to be effected, it is necessary to carry out the modulation of an input signal voltage in response to the applied voltage-transmittance characteristic, namely, a $\gamma$ correction having a strong non-linearity.

SUMMARY OF THE INVENTION

It is, therefore, an object of the present invention to provide a liquid crystal display element comprising substrates at least one of which is transparent and electrodes at least one of which is transparent and a liquid crystal and solidified matrix composite, in which liquid crystal is dispersed and held in a solidified matrix, which is interposed between a pair of electrodes in opposition to each other, characterized in that there are differences in the distances between the electrodes at various portions wherein at least one of the electrodes has a fine concave-convex surface at the side for the liquid crystal and solidified matrix composite.

Further, in accordance with the present invention, there is provided a liquid crystal display apparatus comprising a liquid crystal display element which has a pair of substrates with electrodes at least one of which is transparent and a liquid crystal and solidified matrix composite disposed between the pair of electrodes, wherein the liquid crystal and solidified matrix composite includes liquid crystal dispersed and held in a solidified matrix, and a driving circuit to drive the display element wherein at least one of the substrates with electrodes has a fine concave-convex electrode surface at the side for the liquid crystal and solidified matrix composite, and the driving circuit is adapted to apply a plurality of voltages lower than a saturation voltage to show a half tone display.

Further, in accordance with the present invention, there is provided a projection type liquid crystal display apparatus which comprises a liquid crystal display element comprising a liquid crystal and solidified matrix composite, in which liquid crystal is dispersed and held in a solidified matrix, which is interposed between a pair of substrates with electrodes at least one of which is transparent, characterized in that at least one of the substrates with electrodes has a fine concave-convex electrode surface at the side for the liquid crystal and solidified matrix composite, a driving circuit to drive the liquid crystal display element, a projection light source for emitting light to the liquid crystal display element, and a projection optical system for projecting the light from the liquid crystal display element onto a projection screen.

In the liquid crystal display element of the present invention, polarization plates are not required because the liquid crystal and solidified matrix composite capable of controlling a scattering state and a transparent state is used. Accordingly, the transmittance of light in a transparent state can be substantially improved, and a bright display is possible. In particular, when the liquid crystal display element is used for a projection type display, a projection type display having brightness and good contrast ratio is obtainable.

The liquid crystal and solidified matrix composite used for the liquid crystal display element of the present invention can provide an effect of controlling image-sticking caused by hysteresis, which is the greatest advantage of the present invention, even in a mode other than a transparent-scattering type mode, as far as a liquid crystal display element comprising liquid crystal and a solidified material is used. Specifically, the liquid crystal and solidified matrix composite can be used for a transparent-absorption type liquid crystal display element or the like which comprises a guest-host type liquid crystal obtained by dissolving a dichroic dye in liquid crystal.

In the present invention, since at least one substrate with an electrode of the pair of substrates with electrodes has a fine concave-convex electrode surface at the side of the liquid crystal and solidified matrix composite, an image-sticking phenomenon due to hysteresis inherent in the liquid crystal and solidified matrix composite can be controlled, whereby a beautiful display can be obtained even in a half tone display. In particular, when the liquid crystal and solidified matrix composite is used as a reflection type liquid crystal display element, there is an advantage that the concave-convex electrode surface controls regular reflection to thereby improve a contrast ratio of the display.

The liquid crystal display element of the present invention can be used not only as a direct view type display element but also as a projection type display element. When the liquid crystal display element is used as a direct view type display element, a display element may be constituted in combination with a backlight, a lens, a prism, a mirror, a diffusion plate, a light absorbing material, a color filter and so on in accordance with desired display characteristics.

The reduction of the hysteresis on the applied voltage-transmittance characteristics of the liquid crystal and solidified matrix composite, which improves the quality of display, can be attained by using material for liquid crystal, material for forming a suitable solidified material by curing a polymeric material, and by optimizing the structure of the liquid crystal and solidified matrix composite. However, a severe controlling technique is required in order to obtain a high quality of display. According to the present invention, the hysteresis (or an optical problem caused by the hysteresis) can be apparently reduced to a practically negligible extent regardless of the amount of hysteresis. Accordingly, the present invention is advantageous in that a range of materials used is widened and margins in manufacturing the liquid crystal display element are enlarged.

According to the present invention, at least one substrate with an electrode is formed to have a fine concave-convex electrode surface at the side of the liquid crystal and solidified matrix composite. Accordingly, there is obtainable a distribution of thickness of the electrode gap, hence, the electric field across the liquid crystal and solidified matrix composite is distributed. As a result, the threshold voltage on the applied voltage-transmittance characteristics is scattered. Namely, even when a liquid crystal and solidified matrix having a hysteresis characteristic is used, the threshold voltage is scattered because of a distribution of electric field across the liquid crystal and solidified matrix composite according to the distribution of the electrode gap, and there is obtainable an electro-optical characteristic as the mean value of the electrode gap of various portions. Accordingly, the apparent hysteresis is reduced.

DETAILED DESCRIPTION OF THE PREFERRED EMBODIMENTS

In the following, preferred embodiments of the liquid crystal display element of the present invention will be described with reference to the drawings.

Figure 1:
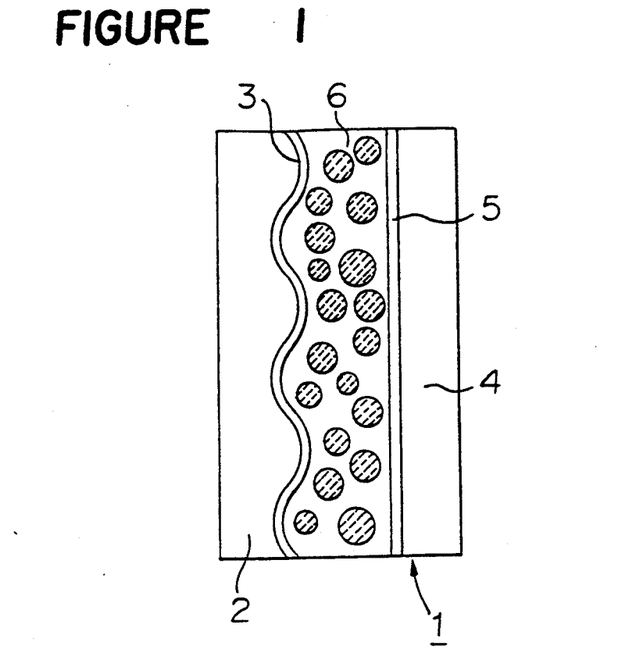
FIG. 1 is an enlarged cross-sectional view of an embodiment of the liquid crystal display element according to the present invention.

FIG. 1 is an enlarged cross-sectional view of an embodiment of the liquid crystal display element according to the present invention.

In FIG. 1, reference numeral 1 designates a liquid crystal display element, numeral 2 designates a substrate having a concave-convex surface which is made of a material such as glass, plastics or the like, numeral 3 designates an electrode such as ITO ($In_2O_3$-$SnO_2$), $SnO_2$ or the like, numeral 4 designates a substrate having a flat surface made of a material such as glass, plastics, numeral 5 designates an electrode such as ITO ($In_2O_3$-$SnO_2$), $SnO_2$, Al, Cr or the like, and numeral 6 designates a liquid crystal and solidified matrix composite such as a liquid crystal and polymer composite held between both substrates (electrodes).

In the present invention, at least one substrate of the pair of substrates has concave-convex electrode surface. In the embodiment shown in FIG. 1, the substrate depicted at the left side of the drawing has an electrode surface has concave and convex portions. However, the substrate depicted at the right side can be the substrate having a concave and convex electrode surface, or both substrates may have a concave-convex electrode surface. The formation of the concave-convex surface may be formed by blasting fine particles, grinding, etching or another suitable treatment on the substrate. Then, the electrode may be prepared. An insulator layer or a smoothing layer or another layer may be formed additionally on the electrode layer having a concave-convex surface corresponding to the substrate surface. As the basic idea of the present invention, it is important that there are differences in the distances between the electrodes at various portions. Accordingly, the concave-convex portions may be formed by means of an electrode having concave-convex portions while the substrate is formed flat.

If only the electrode gap is distributed, it is no problem that the thickness of a liquid crystal and polymer composite may be uniform by forming a smoothing layer on the concave-convex electrode surface.

When the liquid crystal display element of the present invention is used as a transmissive type, the electrodes for both substrates should be transparent. When the display element is used as a reflection type, either one of the electrodes should be a reflection electrode of metal or a combination of a transparent electrode and a reflection layer to obtain the reflection of light. Each picture element may be provided with an active element such as a TFT (thin film transistor), a thin film diode, a MIM or the like. A picture element electrode may be a transparent electrode while wiring on the substrate for the active element is of metal so as to be an opaque electrode. Further, a photo-sensitive layer is laminated to the substrate for use of writing by light.

When the active element is to be arranged, it is normally disposed at a flat surface side of the substrate. A light beam for the display element with a photoconductive layer or an electronic gun may be used to supply an electric charge in a picture element instead of the application of a voltage to a picture element by means of an active element.

The effective optical-path in a liquid crystal and solidified matrix composite of a reflection type display element is twice as long as that of a transmissive type display element. Then, in a scattering state, the scattering ability of a reflection type display element is more than that of a transmissive type display element. As a result, the performance of a display apparatus comprising a reflection type display element can be improved compared with a display apparatus comprising a transmissive type display element. (For example, lower driving voltage, higher contrast ratio or a brighter image can be achieved.)

In use of the display element for a reflection type, the regular reflection of light at the outer and inner surfaces of the substrate disposed at the front side (the side from which light enters and to which light emits) may cause the reduction of the contrast ratio. Accordingly, the regular reflection at the interface between the inner surface of the substrate and a liquid crystal and polymer composite can be reduced by using a substrate having a concave-convex electrode surface at the front side. Namely, both advantages of the reduction of hysteresis and glare control (by which the contrast ratio is improved) can be simultaneously obtained by using a substrate having a concave-convex electrode surface.

In particular, in case of use as a projection type liquid crystal display apparatus, an aperture as a device for reducing diffusion light which is described hereinafter is used. Accordingly, since almost all the reflection light of scattered light at the interface of the substrate having a concave-convex electrode surface does not pass through the aperture because the reflection light becomes diffusion light, whereby the contrast ratio of a projection image is improved. In this case, a concave-convex structure constituted by a surface inclined at a suitable angle is more effective to remove the scattering at the interface of the substrate, than a concave-convex structure of a rectangular shape having a flat surface. It is preferable that the angle of inclination to the surface of reflection is in a range of from about 2° to 30°. Using a reflection type display element improves the scattering ability of the display apparatus. Accordingly, the degree of collimation for incident light into the display element for same screen contrast ratio is relaxed. As a result, a brighter projection image can be realized compared with the display apparatus comprising a transmissive type display element.

In the case of the previously mentioned transparent-absorption type liquid crystal display element comprising liquid crystal and a solidified matrix composite, both advantages of the reduction of hysteresis and the formation of a diffusion reflector can be simultaneously obtained by using a substrate having a concave-convex reflection electrode surface.

In order that the electro-optical characteristic is averaged to an observer, it is important that the pitch of the concave-convex portions in the substrate having a concave-convex electrode surface is smaller than the size of the picture element for display. For instance, when a projection type active matrix display element is used, the size of the element is relatively small while the size of a picture element is usually in a range of from about 30 $\mu$m to 200 $\mu$m. Accordingly, a pitch of concave-convex portions should be smaller than the size of the picture element. Generally, the pitch is preferably 100 $\mu$m or lower for the projection type active matrix display element.

When the pitch is too small, the effect of averaging the electro-optical characteristic decreases, and the reduction of the image-sticking due to hysteresis can not be expected. In a case of using a liquid crystal and solidified matrix composite, the smallest scale of the effect of averaging the electro-optical characteristic is determined by the size of liquid crystal droplets dispersed and held in a solidified matrix.

The transparent-scattering characteristics of the display element of the present invention are obtainable by causing a change of arrangement of the liquid crystal molecules in liquid crystal droplets by the application of an electric field, whereby there is a change of the refractive index of the liquid crystal for the incident light used. Accordingly, it is necessary that the pitch of the concave-convex portions of the display element is equal to or greater than the diameter of liquid crystal droplets in order to reduce the image-sticking phenomenon.

Further, in a structure of the liquid crystal and solidified matrix composite having a high scattering property at a scattering state, and in consideration that the cross-sectional area of scattering is about several times (about 3-5 times) as large as the cross-sectional area of the droplets, a strong image-sticking reducing effect can be obtained in a case that the pitch P of the concave-convex portions is two or more times as large as the diameter of the liquid crystal droplets. Accordingly, it is preferable that the relation of the pitch P of the concave-convex portions to the mean diameter $R_{LC}$ of liquid crystal droplets is $2 \cdot R_{LC} \leq P$.

In a case of a liquid crystal and solidified matrix composite capable of being driven at a low voltage, $R_{LC}$ is usually about 2 $\mu$m. In this case, however, the range of the pitch P is about 4 $\mu$m or more. Under such condition, needless scattering at the interface of the concave-convex portions to the liquid crystal and solidified matrix composite rarely occurs, to thereby reduce transparency at a transparent state. Accordingly, there is obtainable a high transmittance.

The pitch P referred to in this description does not necessarily mean that the concave-convex portions have a periodic structure, but it means a value obtained by dividing "a unit length" by "the number of crest in the cross-sectional profile in the unit length" ("the number of crest in the cross-sectional profile" is defined in JIS B 0601-1982).

It is important to form a distribution of thickness of the liquid crystal and solidified matrix composite to some extent to obtain a substantial reduction of the hysteresis. When the depth d of the concave-convex portions of the substrate having a concave-convex electrode surface with respect to a mean value of gap (space) between electrodes is too small, the effect by dispersing a threshold voltage is not realized, and the effect of reducing the hysteresis can not be expected. On the contrary, when the depth d is too large, there are local portions having a small thickness, whereby the contrast ratio decreases.

The depth d of the concave-convex portions is not usually uniform, but has a distribution. In the present invention, the distribution is expressed by a mean surface roughness Ra of concave-convex deviated from the center line of the surface which is defined in JIS B 0601-1982. In order to obtain a substantial effect to reducing the hysteresis, the values Ra and G should have the optimum relation described in the equation (1):

$$0.03 \cdot G < Ra < 0.3 \cdot G \quad (1)$$

When the distance in average G between opposing electrodes is 10 μm, the mean surface roughness Ra of concave-convex deviated from the center line of the surface is in a range of 0.3 μm-3 μm. When both substrates have concave-convex electrode surfaces, the value Ra in consideration of the both concave-convex structures should satisfy the above-mentioned range. Namely, as a result, the electrode gap has the corresponding distribution according to the surface roughness.

Thus, in accordance with the present invention, the linearity in the applied voltage-transmittance characteristics can be improved and an excellent gray scale display is obtainable without a special correction. These features are derived from the fact that the electro-optical characteristics are averaged.

Figure 2:
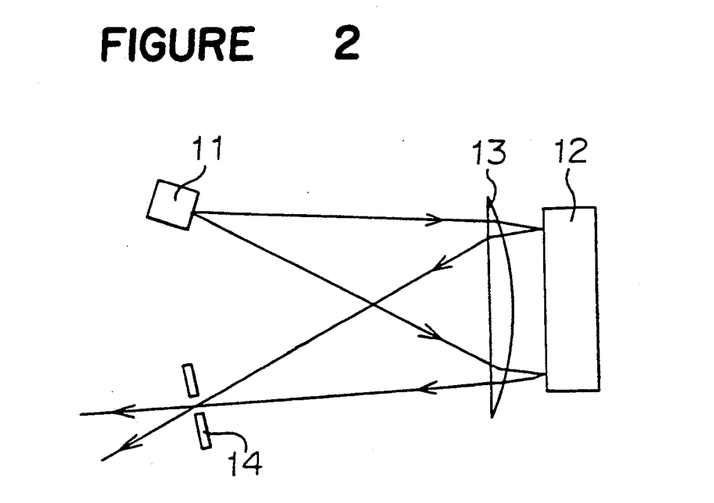
FIG. 2 is a diagram showing an embodiment of the reflection and projection type liquid crystal display apparatus in which the liquid crystal display element of the present invention is used.

FIG. 2 is a diagram showing an embodiment of a projection type liquid crystal display apparatus having the reflection type liquid crystal display element shown in FIG. 1.

In this reflection type liquid crystal display element, the reflection layer and the electrode are formed on the flat surface of the substrate.

In FIG. 2, reference numeral 11 designates a projection light source, numeral 12 designates a reflection type liquid crystal display element, numeral 13 a lens, numeral 14 an aperture as a device for reducing diffusion light, which projects a picture image on a projection screen (not shown).

Referring to the apparatus shown in FIG. 2, light emitted from the projection light source 11 which is disposed at the left side of the liquid crystal display element in the drawing and is constituted by a lamp, a reflection mirror, a lens and so on is incident into the liquid crystal display element 12 via the lens 13. The incident light is reflected at the rear side (right side) of the liquid crystal display element 12 and emits toward the left side. The emitted light passes through the lens 13 and diffusion light is reduced by the aperture 14, and only light passing through the aperture 14 is projected on the projection screen.

The projection light source may be a conventional one, and it may be in combination of a lamp such as a metal halide lamp, a halogen lamp, a xenon lamp or the like, a lens, a mirror for light focusing such as a spherical mirror, an elliptic mirror and an aperture to obtain parallel light beams if necessary.

The parallel light beams may be obtained by passing laser beams through a beam expander. In order to obtain a color display, for example, a dichroic prism is arranged between the lens 13 and the liquid crystal display element 12 or between the lens 13 and the aperture 14, and three liquid crystal display elements are arranged at three sides of the dichroic prism.

In FIG. 2, the lens 13 and the aperture 14 constitute a projection optical system. The optical system is to project the straight-forward light emitted from the liquid crystal display element on a projection screen. As the projection lens, the lens 13 alone is sufficient, but an additional lens may be disposed between the lens 13 and the aperture 14 or at the light-outgoing side of the aperture 14. In order to improve the quality of a projection image, it is preferable to dispose a projection lens near the aperture 14 in addition to the lens 13.

As the device for reducing diffusion light, it is preferred to use such device that among incident light emitted from the liquid crystal display element, only straight-forward light is passed and diffusion light is removed. As described above, an aperture having a small opening is usually used. Alternatively, a small reflection mirror may be arranged instead of the aperture so that only straight-forward light is taken.

The operations of the projection type liquid crystal display apparatus shown in FIG. 2 will be described briefly.

The liquid crystal display element assumes a transparent state, a scattering state and an intermediate state for each picture element in response to applied voltages.

At a portion in a transparent state, incident light is regularly reflected at the reflection layer on the flat surface of the substrate at the backside of the display element and is emitted from the incident side. Since the emitting light has the same optical axis as that of regular reflection light, it passes through the aperture 14. Accordingly, there appears a bright light spot on the projection screen. On the other hand, at a portion in a scattering state, incident light is scattered and the scattered light is emitted from the light incident side. The major portion of the scattered light has an optical axis different from that of the regular reflection light, whereby it does not pass the aperture 14. Accordingly, there appears a dark point on the projection screen. At a portion in an intermediate state, a part of incident light passes through the aperture 14, whereby a display of a half tone appears on the projection screen.

When the liquid crystal display element shown in FIG. 1 is used for the display apparatus shown in FIG. 2, an image-sticking phenomenon due to hysteresis can be controlled and a display having a high contrast ratio is possible. In this case, reflection of incident light at the outer surface (the left side surface of the substrate placed at the left side in FIG. 1) of the substrate of the liquid crystal display element reduces the contrast ratio. Accordingly, the outer surface of the substrate should be provided with an antireflection coating of an optical interference multilayer to thereby control glaring.

The liquid crystal display element of the present invention has an effect to control image-sticking due to hysteresis even when it is used for a transparent type. In this case, a projection light source is provided on the left side and a projection optical system is provided on the right side in FIG. 2 so that light is incident to the liquid crystal display element from the left side and the light is emitted from the right side.

In the present invention, the liquid crystal and solidified matrix composite in which liquid crystal is dispersed and held in a solidified matrix is held between two substrates with electrodes at least one of which has a concave-convex surface. The liquid crystal and solidified matrix composite comprises a solidified matrix having a large number of fine holes and a nematic liquid crystal filled in the holes. The liquid crystal and solidified matrix composite assumes a transparent state and a scattering state depending on conditions that a voltage is applied across the electrodes between which the liquid crystal and solidified matrix composite is held. Namely, the refractive index of the liquid crystal is changed due to an applied voltage, hence, the relation between the refractive index of the solidified matrix and the refractive index of the liquid crystal is changed. Namely, when the refractive indices are in agreement with each other, a transparent state is provided, and when not, scattering state is provided.

The liquid crystal and solidified matrix composite comprising the solidified matrix having a large number of fine holes and the liquid crystal filled in the holes has such a structure that liquid crystal droplets are sealed in vacuoles such as microcapsules, wherein the individual microcapsules may not be completely independent or the individual vacuoles may be communicated with each other through fine gaps like a porous material.

The liquid crystal and solidified matrix composite for the liquid crystal display element of the present invention can be prepared by mixing a nematic liquid crystal and a curable compound for forming the solidified matrix into a solution or a latex, by curing the solution or the latex by the application of light or heat, or by removing or by subjecting it to reactive curing to thereby separate the curable compound, whereby the nematic liquid crystal is dispersed in the solidified matrix.

Use of a photo-curable or heat-curable type compound is preferred since it can be cured in an enclosed system. In particular, use of a photo-curable type compound is preferred since it can be cured in a short period of time with little influence of heat.

As a specific production method, a cell may be formed by using a sealing material, uncured mixture of a nematic liquid crystal and a curable compound is injected through an injection port in the same manner as the conventional method, and after sealing the injection port, they can be cured by light irradiation or heating.

Further, the liquid crystal display element according to the present invention, may also be prepared without using a sealing material, for example, by supplying an uncured mixture of the nematic liquid crystal and the curable compound on a substrate with an electrode, overlaying another substrate with an electrode on that substrate, and then curing the material by means of light irradiation or the like.

The periphery of the display element may be sealed by coating the sealing material. According to this production method, since it is only required to supply the uncured mixture of the nematic liquid crystal and the curable compound by means of coating such as roll coating, spin coating, printing or the method of using a dispenser or the like, the injection step is simple and productivity is extremely high.

Further, the uncured mixture of the nematic liquid crystal and the curable compound may be incorporated with spacers for controlling the inter-substrate gap such as ceramic particles, plastic particles or glass fibers, pigments, dyes, viscosity controllers or any other additives which do not adversely influence the performance of the liquid crystal display element of the present invention.

During the curing step of the liquid crystal display element which shows a scattering state when no voltage is applied, if the element is cured under the condition that a sufficiently high voltage is applied to only a specified portion, it is possible to render that portion to be a normally-light-transparent state. Accordingly, if a fixedly displaying portion is required, a normally light transparent portion may be formed. On the contrary, in a case of using the display element which shows a transparent state when no voltage is applied, a normally scattering portion can be formed in the same manner as above.

Use of the liquid crystal and solidified matrix composite having a specific resistance of $5 \times 10^9$ $\Omega$cm or higher is preferable. Use of one having a specific resistance of $10^{10}$ $\Omega$cm or higher is more preferable in order to minimize voltage drop caused by a leakage current. This reduces electric power consumption. In particular, a liquid crystal display element in which an active element is used for each picture element, it is unnecessary to provide a relatively large capacitance to each picture element electrode.

In the liquid crystal display element using the liquid crystal and solidified matrix composite, higher transmittance in a transparent state is preferable, and the haze value in a scattering state is preferably not less than 80%.

The liquid crystal display element of the present invention is so adapted that in either state of voltage application or no voltage application, the refractive index of the solidified matrix (after curing) agrees with the refractive index of the liquid crystal used, and in the opposite state, the refractive index of the solidified matrix does not agree with the refractive index of the liquid crystal used.

Thus, light is transmitted when the refractive index of the solidified matrix agrees with the refractive index of the liquid crystal, while the light is scattered (opaque) when they do not agree with each other. The scattering ability of the element is higher than that of the liquid crystal display element in the conventional DS mode, and a display having a high contrast ratio can be obtained.

In the present invention, it is preferable that the refractive index of the solidified matrix (after curing) agrees with the ordinary refractive index ($n_0$) of the liquid crystal used, in a state of applying a voltage. In the above-mentioned case, the display element exhibits a transparent state when a voltage is applied, whereby the transmittance in a transparent state becomes high and a uniform transparent state is obtainable. Accordingly, a display having a high contrast ratio can be provided.

The refractive index anisotropy $\Delta n$ ($=n_e-n_0$) of the liquid crystal used should have a large value to some extent in order that it enhances the scattering property when no voltage is applied, and a high scattering ability is obtained. Specifically, the refractive index anisotropy should be $\Delta n > 0.18$, more preferably $\Delta n > 0.22$. Further, it is preferable that the ordinary refractive index $n_0$ of the liquid crystal used substantially agrees with the refractive index $n_p$ of the solidified matrix, whereby a high transparency is obtainable when a voltage is applied. Specifically, a relation of $n_0 - 0.03 < n_p < n_0 + 0.05$ should be satisfied.

In order to improve the scattering ability when no voltage is applied, it is effective to increase the volume fraction $\Phi$ of the liquid crystal which is operable in the liquid crystal and solidified matrix composite. The range of $\Phi > 20\%$ is preferred. In order to obtain higher scattering ability, it is preferable to be $\Phi > 35\%$, more preferably, $\Phi > 45\%$. On the other hand, when the value $\Phi$ is excessively large, the stability in structure of the liquid crystal and solidified matrix composite becomes inferior. Accordingly, it is preferable that $\Phi < 70\%$. In the liquid crystal display element of the present invention wherein the ordinary refractive index ($n_0$) of the liquid crystal used agrees with the refractive index of the solidified matrix, a scattering state (i.e., an opaque state) is shown due to a difference in refractive index between the liquid crystal which is not arranged in parallel in a specified direction and the solidified matrix, when no voltage is applied.

When the liquid crystal display element is used for a projection type display apparatus, the portion other than picture elements scatters light and looks dark because light does not reach a projection screen without providing a light shielding layer at the portion other than the picture elements. From this, it is unnecessary to provide a light shielding layer for the portion other than the picture element electrodes in order to prevent light from leaking from any other portion of the liquid crystal display element than the picture element electrodes. Accordingly, there is an advantage that the step of forming the light shielding layer is unnecessary.

A voltage is applied to a desired picture element. At the picture element portion to which the voltage is applied, the liquid crystal is oriented so that the ordinary refractive index ($n_o$) of the liquid crystal and the refractive index ($n_P$) of the solidified matrix agree with each other, and accordingly, the liquid crystal display element presents a transparent state. Then, light is transmitted through desired picture elements to thereby provide a bright display on a projection screen.

In the present invention, when a photo-curable compound is used as an uncured curable compound which forms the liquid crystal and solidified matrix composite, a photo-curable vinyl compound is preferably used. Specifically, there can be exemplified a photo-curable acryl compound, and particularly, those containing acryl oligomer which is curable upon polymerization under the irradiation of light are particularly preferred.

The liquid crystal used in the present invention is preferably a nematic liquid crystal having a positive dielectric anisotropy. Particularly, it is preferable to use liquid crystal wherein the refractive index of the solidified matrix agrees with the refractive index of the liquid crystal when a voltage is applied or no voltage is applied. Such liquid crystal may be used solely or may be used as a composition, and use of a composition can be advantageous because various demands such as working temperature range, working voltage and so on are satisfied. It is, in particular, preferable to use such liquid that the refractive index of the solidified matrix agrees with the ordinary refractive index ($n_o$) of the liquid.

When a photo-curable compound is used for the liquid crystal and solidified matrix composite, it is preferable for the liquid crystal to uniformly dissolve the photo-curable compound. A cured material after exposure to light can not be dissolved or is hardly dissolved. When liquid crystal is used as a composition, it is preferable to use each liquid crystal having a closer value in solubility.

In the present invention, since liquid crystal is used as solvent in the liquid crystal and solidified matrix composite, and a photo-curable compound is cured by exposing it to light. It is unnecessary to evaporate water or solvent which becomes needless when the compound is cured. Accordingly, a conventional method of injecting a curable compound in a cell can be utilized as it is because the photo-curable compound is cured in a closed system whereby reliability is high. Further, since the photo-curable compound is capable of bonding two substrates, reliability is higher.

In the present invention, since at least one substrate has a concave-convex surface and the liquid crystal and solidified matrix composite is interposed between the two substrates, a danger of short-circuitting at a small gap portion can be minimized. Further, it is unnecessary to strictly control the orientation of liquid crystal and the inter-substrate gap as in the conventional TN type liquid crystal display element. Accordingly, a liquid crystal display element capable of controlling a transparent state and a scattering state can be efficiently produced.

In a case of using TFT as an active element, silicone is suitable as a semiconductor material. Polycrystalline silicone is particularly preferred since it has less photosensitivity as in amorphous silicone and, accordingly, does not cause erroneous operation even without shielding light from a light source by means of a light shielding film. In the case of using polycrystalline silicone for a projection type liquid crystal display apparatus in the present invention, a strong light source for projection can be utilized and a bright display is obtainable.

In the present invention, liquid crystal and solidified matrix composite wherein the refractive index of the solidified matrix substantially agrees with the ordinary refractive index ($n_o$) of the liquid crystal is used. Accordingly, light is scattered at the portion not applied with an electric field, and it appears dark on the projection screen. Accordingly, there is no requirement for forming the light shielding film in the portion where no voltage is applied, between the picture elements.

Therefore, in the case of using the polycrystalline silicone as the active element, there is no requirement for forming the light shielding film at the active element portion, and accordingly, the step of forming the light shielding film can be eliminated or severe requirements to the light shielding film can be reduced, whereby the number of manufacturing steps can be reduced and the productivity is improved.

In the liquid crystal display element and the liquid crystal display apparatus of the present invention, an infrared ray cut filter, an ultraviolet-ray cut fi..., a color filter or the like may be used in a lamination form; a cooling system may be added; a reinforcing glass sheet may be laminated, or characters, figures or the like may be printed. Further, a plurality of liquid crystal display elements may be used. In addition, a dichroic mirror, a dichroic prism or a mirror may be used so that light from a light source is separated or light emitted from the liquid crystal display element is collected.

In the present invention, at least one substrate with an electrode between the two substrates with electrodes is provided with a fine concave-convex electrode surface at the side for the liquid crystal and solidified matrix composite. Accordingly, there is a distribution of thickness of the electrode gap and the electric field across the liquid crystal and solidified matrix composite is distributed. As a result, the threshold voltage value of the composite is dispersed, whereby an image-sticking phenomenon due to hysteresis can be controlled. The control of the image-sticking is effected only by controlling a concave-convex portion of substrate. The allowable range of control is wide, and the productivity is excellent. Accordingly, a beautiful display is obtainable even in a half tone display.

When the liquid crystal display element is used for a reflection type liquid crystal display, a concave-convex portion is formed in the substrate at the light-incident side, whereby glare, i.e. regular reflection can be controlled and the contrast ratio of display is improved.

In the following, the present invention will be described in more detail in connection with various Examples.

EXAMPLE 1

A nematic liquid crystal having a positive dielectric anisotropy, acrylate monomer, urethane acrylate oligomer and a photo-cure initiator were uniformly dissolved to prepare solution. A cell was prepared by using a TFT substrate with a TFT for each picture element transparent electrode on the flat surface, a counter electrode substrate having a counter transparent electrode and spacers each having a diameter of 10 μm. The previously prepared solution was injected into the cell and the solution was cured by irradiating ultraviolet-rays to form a liquid crystal and solidified matrix composite. The average diameter of liquid crystal droplets $R_{LC}$ was about 2 μm.

The size of picture element was about 200 μm×200 μm. A concave-convex treatment was conducted to the portion of the counter electrode substrate in contact with the liquid crystal and polymer composite. The pitch and the depth of the concave-convex portion were respectively 20 μm and 4 μm, and the mean surface roughness Ra of the concave-convex portion was about 1 μm. ITO was vapor-deposited on the concave-convex surface to form a counter electrode. The average interelectrode gap was about 12 μm.

When the liquid crystal display element was driven by an applied voltage of about 7 V, a display substantially free from image-sticking was obtained.

A projection type liquid crystal display apparatus was prepared by using the transmissive type liquid crystal display element, a projection light source and a projection optical system. As a result of tests, a dynamic display having a contrast ratio of 120 was obtained on a projection screen. In the measurement of the applied voltage-transmittance characteristic of the display element, the transmittance at 7 V was 70%. The hysteresis was very small to the extent that the maximum difference in transmittance between a voltage increase time and a voltage decrease time was 2.8% wherein voltage was increased from 0 V to 10 V and then was reduced to 0 V.

COMPARATIVE EXAMPLE 1

A cell was prepared in the same manner as Example 1 except that the counter substrate was a flat substrate on which ITO was vapor-deposited and the average interelectrode gap was 12 μm which was the same value as that of Example 1. A liquid crystal and polymer composite was prepared in the same manner as Example 1 to form a display cell. When the display element was driven by applied a voltage of about 7 V, an image-sticking phenomenon was found in display.

A projection type display apparatus was prepared in the same manner as Example 1. It was found that the contrast ratio on the projection screen was about 130. As a result of measurement of the applied voltage-transmittance characteristic of the display element, the transmittance at 7 V was 71%, and the maximum difference of the transmittance due to hysteresis was 5.0%.

EXAMPLES 2 AND 3 AND COMPARATIVE EXAMPLES 2 AND 3

Liquid crystal display elements were prepared in the same manner as Example 1 except that the mean electrode gap G (μm) and the mean surface roughness Ra (μm) of concave-convex portions of the substrate having a concave-convex surface of each of the display elements were determined as shown in Table 1. The contrast ratio CR on a projection screen, the transmittance $T_{7v}$ (%) and the maximum difference of the transmittance ΔT (%) due to hysteresis of projection type display apparatuses in which the above-mentioned display elements were installed, are also shown in Table 1.

TABLE 1

| Examples | G (μm) | P (μm) | Ra (μm) | CR | $T_{7v}$ (%) | ΔT (%) |
|---|---|---|---|---|---|---|
| Example 1 | 12 | 20 | 1.0 | 120 | 70 | 2.8 |
| Example 2 | 11 | 20 | 1.5 | 100 | 70 | 2.6 |
| Example 3 | 8 | 20 | 1.5 | 70 | 75 | 1.8 |
| Example 4 (Reflection type) | 10 | 9 | 0.4 | 110 | 68 | 2.8 |
| Comparative Example 1 | 12 | — | 0 | 130 | 71 | 5.0 |
| Comparative Example 2 | 11 | 20 | 0.2 | 120 | 72 | 5.0 |
| Comparative Example 3 | 11 | 20 | 4.5 | 30 | 55 | 2.0 |
| Comparative Example 4 | 12 | 3 | 0.5 | 90 | 65 | 4.8 |

EXAMPLE 4

A liquid crystal display element was prepared in the same manner as Example 1, and a projection type liquid crystal display apparatus was prepared by combining the liquid crystal display element with a projection light source and a projection optical system wherein the electrodes of the TFT substrates were made of aluminum which were used as reflection type elements, and an antireflection coating of an optical interference multilayer was provided on the outer surface of the electrode of the counter electrode substrate. In the liquid crystal display element, the average interelectrode gap was about 10 μm, the pitch P of concave-convex was about 9 μm, the depth of concave-convex was about 1.3 μm and Ra was about 0.4 μm.

In this projection type liquid crystal display apparatus, the degree of collimation for incident light into the liquid crystal display element was about twice as large as that of Example 1 to 3.

The projection type liquid crystal display apparatus was driven by a video signal of a driving voltage of about 6 V. As a result, a dynamic display free from image-sticking was obtained. The contrast ratio on the projection screen was 110 and the screen brightness was about twice that of Example 1.

COMPARATIVE EXAMPLE 4

Liquid crystal display element was prepared in the same manner as Example 1 except that the pitch was 3 μm and Ra was 0.5 μm. As a result of tests, the contrast ratio was 90, $T_{7v}$ was 65% and ΔT was 4.8%. The transmittance and the contrast ratio were slightly reduced and (the effect of reducing hysteresis) was not substantially found.

In the liquid crystal display element of the present invention, since a liquid crystal and solidified matrix composite such as a liquid crystal and polymer composite is used wherein the electric field of the composite is distributed according to the distribution of the electrode gap, the threshold voltage is dispersed to thereby apparently reduce the hysteresis on the applied voltage-transmittance characteristic of the liquid crystal and solidified matrix composite. Accordingly, the image-sticking of an image can be reduced and a beautiful half tone display can be provided. Further, the linearity of the applied voltage-transmittance characteristic is improved and an excellent gray scale display can be obtained without a special γ correction.

In the present invention, regular reflection can be eliminated because the interface between the liquid crystal and solidified matrix composite and at least one substrate with an electrode is inclined to the mean flat face of the substrate surface. In particular, when the liquid crystal display element is used for a projection type display apparatus, reduction of the contrast ratio due to reflection light can be prevented. When the reflection type liquid crystal display element of the present invention is used for projection type display apparatus wherein the counter electrode on the flat substrate surface is used as a reflection layer, reduction of the contrast ratio due to regular reflection at the interface between the liquid crystal and solidified matrix and transparent electrode can be remarkably improved.

What is claimed is:

1. A liquid crystal display element comprising a pair of substrates, at least one of which is transparent, and a pair of electrodes in opposition to each other, at least one of which is transparent, and a liquid crystal and solidified matrix composite, in which liquid crystal is dispersed and held in a solidified matrix, which is interposed between said pair of electrodes, characterized in that the distances between the electrodes differ at various portions, wherein at least one of the electrodes has a fine concave-convex surface at the side facing the liquid crystal and solidified matrix composite, and the relation $0.03 \cdot G < Ra < 0.3 \cdot G$ is satisfied where G is the mean electrode gap and Ra is the mean distance from a peak convex portion of said concave-convex surface to a plane parallel to said pair of substrates and cutting through the concave-convex surface such that the amount of the surface above the plane is the same as that below the plane, and the pitch P of said concave-convex surface is two or more times as large as the means diameter $R_{LC}$ of liquid crystal droplets of said liquid crystal dispersed in said solidified matrix.

2. The liquid crystal display element according to claim 1, wherein the size L of each picture element is in a range of from about 30 μm to 200 μm, and the pitch P of said concave-convex surface is 100 μm or less and smaller than the size L.

3. The liquid crystal display element according to claim 1, wherein the refractive index of the solidified matrix agrees with the ordinary refractive index ($n_0$) of the liquid crystal used when a voltage is applied to the liquid crystal and solidified matrix composite.

4. A liquid crystal display element comprising a first transparent substrate having a transparent first electrode, and a second substrate having a second electrode in opposition to the first electrode, and a liquid crystal and solidified matrix composite which is interposed between said first and second electrodes, wherein liquid crystal is dispersed and held in a solidified matrix, characterized in that the distances between the electrodes differ at various portions, wherein the first electrode has a concave-convex electrode surface, and the second substrate has a reflecting layer, and the relation $0.03 \cdot < Ra < 0.3 \cdot G$ is satisfied where G is the mean electrode gap and Ra is the mean distance from a peak portion of said concave-convex surface to a plane parallel to said pair of substrates and cutting through the concave-convex surface such that the amount of the surface above the plane is the same as that below the plane, and the pitch P of said concave-convex surface is two or more times as large as the means diameter $R_{LC}$ of liquid crystal droplets of the liquid crystal dispersed in said solidified matrix.

5. The liquid crystal display element according to claim 4, wherein the size L of each picture element is in a range of from about 30 μm to 200 μm, and the pitch P of the concave-convex surface is 100 μm or less and smaller than the size L.

6. The liquid crystal display element according to claim 4, wherein said liquid crystal display element includes an optical interference multilayer disposed at the outer surface side of the substrate having a concave-convex surface, wherein said optical interference multilayer has low reflection.

7. The liquid crystal display element according to claim 4, wherein the second electrode is a reflection electrode formed of metal.

8. The liquid crystal display element according to claim 4, wherein the reflection of light is obtained by a combination of the second electrode, which is transparent, and a reflection layer.

9. The liquid crystal display element according to claim 1 or 4, wherein said electrode having said concave-convex surface has substantially thin and uniform thickness and is formed at a front surface of the substrate upon which incident light is projected.

10. The liquid crystal display element according to claim 1 or 4, wherein said liquid crystal and solidified matrix composite has a specific resistance greater than or equal to $5 \times 10^9$ Ω·cm.

11. The liquid crystal display element according to claim 1 or 4, wherein the refractive index anisotropy of the liquid crystal is greater than 0.18.

12. The liquid crystal display element according to claim 11, wherein the ordinary refractive index $n_0$ o the liquid crystal and the refractive index $n_p$ of the solidified matrix satisfy the following relation:

$$n_0 - 0.03 < n_p < n_0 + 0.05.$$

13. The liquid crystal display element according to claim 1 or 4, wherein the volume fraction of the liquid crystal to the liquid crystal and solidified matrix composite is greater than 20%.

14. The liquid crystal display element according to claim 1 or 4, wherein the volume fraction of the liquid crystal to the liquid crystal and solidified matrix composite is greater than 35%.

15. The liquid crystal display element according to claim 1 or 4, wherein the volume fraction of the liquid crystal to the liquid crystal and solidified matrix composite is greater than 45% but less than 70%.

16. The liquid crystal display element according to claim 1 or 4, wherein said liquid crystal and solidified matrix composite are formed of a photo-curable compound.

17. The liquid crystal display element according to claim 16, wherein said photo-curable compound is an acryl compound.

18. The liquid crystal display element according to claim 16, wherein said photo-curable compound includes an acryl oligomer.

19. The liquid crystal display element according to claim 1 or 4, wherein a photo-sensitive layer is laminated to the substrate for use in optical recording.

20. The liquid crystal display element according to claim 1 or 4, wherein G is in the range of 8 μm to 12 μm.

21. The liquid crystal display element according to claim 20, wherein Ra is in the range of 0.3 μm to 3 μm.

22. The liquid crystal display element according to claim 20, wherein Ra is in the range of 0.4 μm to 1.5 μm.

23. A liquid crystal display apparatus comprising a liquid crystal display element which has a pair of substrates, a pair of electrodes, at least one of which is transparent, and a liquid crystal and solidified matrix composite disposed between the pair of electrodes, wherein the liquid crystal and solidified matrix composite includes liquid crystal dispersed and held in a solidified matrix, and a driving circuit to drive the liquid crystal display element, characterized in that the distances between the electrodes differ at various portions wherein at least one of the electrodes has a concave-convex surface at the side facing the liquid crystal and solidified matrix composite, wherein the relation $0.03 \cdot G < Ra < 0.3 \cdot G$ is satisfied where G is the means electrode gap and Ra is the mean distance from a peak convex portion of said concave-convex surface to a plane parallel to said pair of substrates and cutting through the concave-convex surface such that the amount of the surface above the plane is the same as that below the plane, and the pitch P of said concave-convex surface is two or more times as large as the means diameter $R_{LC}$ of liquid crystal droplets of said liquid crystal dispersed in said solidified matrix.

24. The liquid crystal display apparatus according to claim 23, wherein the liquid crystal display element is a reflection type liquid crystal display element in which one of the pair of substrates with electrodes is a substrate with a transparent electrode and having a concave-convex electrode surface, the other is a substrate having a flat surface and a reflection layer on that.

25. The liquid crystal display element according to claim 23 or 24, wherein one electrode is the transparent electrode and the other electrode is a reflective electrode formed of metal.

26. The liquid crystal display element according to claim 23 or 24, wherein one electrode is the transparent electrode, and reflection of light is obtained by a combination of the other electrode, which is transparent, and a reflection layer.

27. A projection type liquid crystal display apparatus which comprises:

a liquid crystal display element comprising a liquid crystal and solidified matrix composite, in which liquid crystal is dispersed and held in a solidified matrix composite, which is interposed between a pair of substrates with electrodes, at least one of which is transparent, characterized in that at least one of the electrodes has a concave-convex electrode surface at the side facing the liquid crystal and solidified matrix composite, a driving circuit to drive the liquid crystal display element, a projection light source for emitting light to the liquid crystal display element, and a projection optical system for projecting the light from the liquid crystal display element onto a projection screen, wherein the relation $0.03 \cdot G < Ra < 0.3 \cdot G$ is satisfied, where G is the mean electrode gap, and Ra is the mean distance from a peak convex portion of said concave-convex surface to a plane parallel to said pair of substrates and cutting through the concave-convex surface such that the amount of the surface above the plane is the same as that below the plane, and the pitch P of said concave-convex surface is two or more times as large as the mean diameter $R_{LC}$ of liquid crystal droplets of the liquid crystal dispersed in said solidified matrix.

28. The projection type liquid crystal display apparatus according to claim 27, wherein the liquid crystal display element is a reflection type liquid crystal display element in which one of the pair of substrates with an electrode is a substrate with a transparent electrode and having a concave-convex electrode surface, the other is a substrate having a reflection layer.

29. The projection type liquid crystal display apparatus according to claim 28, wherein said projection type liquid crystal display apparatus includes an optical interference multilayer disposed at the outer surface side of the substrate having a concave-convex surface of the liquid crystal display element, wherein said optical interference multilayer has low reflection.

30. The projection type liquid crystal display apparatus according to claim 28, wherein the refractive index of the solidified matrix agrees with the ordinary refractive index ($n_0$) of the liquid crystal used when a voltage is applied to the liquid crystal and solidified matrix composite.

31. The projection type liquid crystal display apparatus according to claim 28, wherein a device for reducing diffusion light is disposed in a path of light from the liquid crystal display element.

32. The projection type liquid crystal display apparatus according to claim 27 or 28, wherein the size L of each picture element of the liquid crystal display element is in a range of rom about 30 $\mu$m to 200 $\mu$m, and the pitch P of said concave-convex surface is 100 $\mu$m or less and smaller than the size L.

* * * * *